United States Patent [19]

Messenger

[11] 4,202,413
[45] May 13, 1980

[54] WELL CEMENTING PROCESS USING PRESHEARED WATER SWELLABLE CLAYS

[75] Inventor: Joseph U. Messenger, Dallas, Tex.

[73] Assignee: Mobil Oil Corporation, New York, N.Y.

[21] Appl. No.: 960,803

[22] Filed: Nov. 15, 1978

[51] Int. Cl.² .............................................. E21B 33/14
[52] U.S. Cl. ............................... 166/292; 166/DIG. 1
[58] Field of Search .................. 166/292, 293, DIG. 1; 106/98, 97, 90

[56] References Cited

U.S. PATENT DOCUMENTS

| | | | |
|---|---|---|---|
| 2,582,459 | 1/1952 | Salathiel | 106/90 |
| 2,705,050 | 3/1955 | Davis et al. | 166/293 |
| 3,071,481 | 1/1963 | Beach et al. | 106/90 |
| 3,168,139 | 2/1965 | Kennedy et al. | 166/293 X |
| 3,197,317 | 7/1965 | Patchen | 166/292 |
| 3,227,213 | 1/1966 | Smith | 166/292 |
| 3,557,876 | 1/1971 | Tragesser | 166/292 |
| 3,581,825 | 6/1971 | Messenger | 166/292 X |
| 3,887,009 | 6/1975 | Miller et al. | 166/292 |

*Primary Examiner*—Stephen J. Novosad
*Attorney, Agent, or Firm*—Charles A. Huggett; Raymond W. Barclay; Charles J. Speciale

[57] ABSTRACT

A method of preparing and using a cement slurry having water swellable clays therein as extenders for the cement is described, which method enhances the effectiveness of the water swellable clays by preshearing aqueous suspensions thereof prior to mixing these suspensions with cement to form a pumpable cement slurry. Also described is a particular technique for using bentonite as a cement extender in a cement slurry formed with salt water.

14 Claims, 1 Drawing Figure

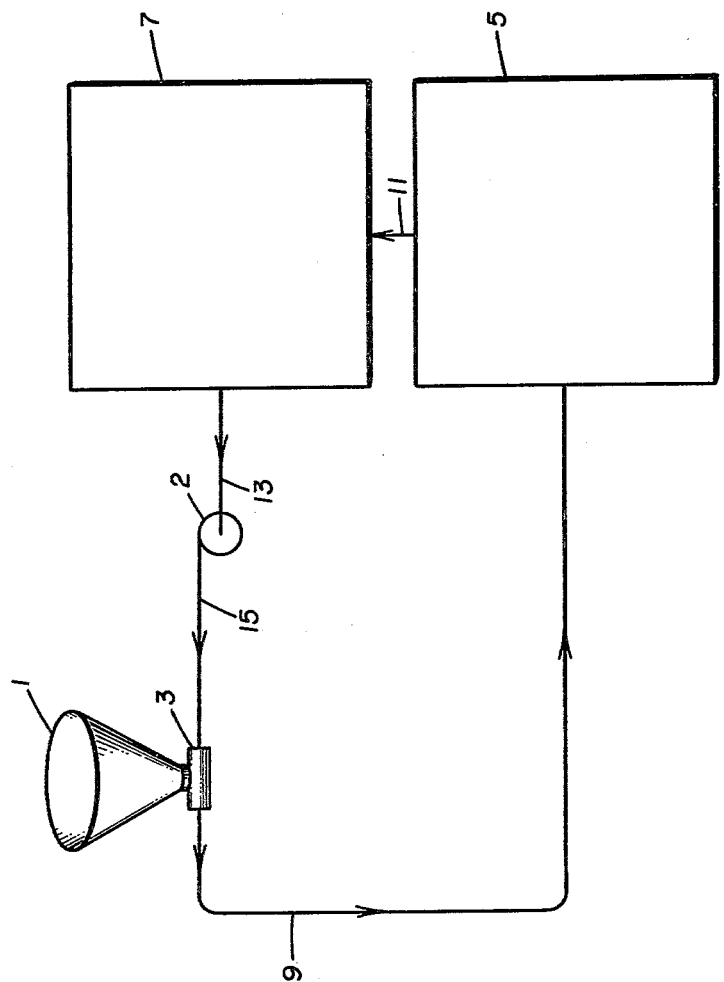

WELL CEMENTING PROCESS USING PRESHEARED WATER SWELLABLE CLAYS

BACKGROUND OF THE INVENTION

This invention is related to cementing a well that is drilled into the earth and more particularly relates to a method of forming a lightweight or low density slurry and using this lightweight slurry in the cementing of the well.

In the completion of a well drilled into the earth, pipe or casing is normally lowered into the well and a cement slurry is pumped down the well and up the annular space formed between the pipe and the wall of the well. The cement slurry is then maintained in the annular space and allowed to set and bond the pipe to the wall of the well to thereby hold the pipe in place and prevent fluids from flowing behind the pipe. Many different cements and cement slurries have been used for this purpose though portland cement and calcium aluminate cement are probably the most common. Various additives and formulations have been used with these cements in forming slurries having particularly desirable properties. For example, bentonite and attapulgite clays have been added to cement slurries as have sodium chloride, calcium chloride, dispersing agents and gypsum.

In U.S. Pat. No. 2,582,459 to Richard A. Satterfield, bentonite and a soluble salt of a sulfonic acid are added to portland cement to produce an oil well cement which has low mechanical strength and will not shatter upon impact. In U.S. Pat. No. 3,071,481 to Horace J. Beach et al, there is described a gel cement composition for use in cementing wells. This composition consists essentially of a hydraulic cement, a colloidal clay, sodium chloride or calcium chloride and an organic dispersing agent. In U.S. Pat. No. 3,197,317 to Freeman D. Patchen, attapulgite is added to portland cement slurries for use in oil well cementing to reduce the density of the slurries. In U.S. Pat. No. 3,227,213 to Dwight K. Smith, water swelling clays, such as bentonite or attapulgite, are prehydrated and then mixed with hydraulic cement of the character of portland to form a slurry having a much higher yield than a slurry utilizing dry bentonite. In U.S. Pat. No. 3,581,825 to Joseph U. Messenger, there is described a method of cementing wells wherein slurries of calcium aluminate cement and clay selected from the group of bentonite, attapulgite and mixtures thereof are used, which slurries are particularly applicable for use in cementing behind casing in permafrost zones.

SUMMARY OF THE INVENTION

This invention is directed to a method of cementing a well with a lightweight pumpable cement slurry. The lightweight cement slurry is formed by first forming a mixture of a water swellable clay and water, the clay being present in the mixture in a predetermined amount. The mixture of clay and water is then subjected to a vigorous shearing action for a predetermined time to preshear the clay. Thereafter, the presheared clay and water is mixed with hydraulic cement in a predetermined amount to form a lightweight cement slurry and the lightweight slurry is positioned in a well and there maintained and allowed to set.

BRIEF DESCRIPTION OF THE DRAWING

The drawing is a schematic FIGURE illustrating the method of this invention.

DESCRIPTION OF THE PREFERRED EMBODIMENTS

This invention is directed to a process for forming and using a lightweight cement slurry for cementing wells extending into the earth and in particular for cementing pipe such as well casing in a wellbore that extends into the earth.

In the completion of a well drilled into the earth, it is the usual practice to case the wellbore. This is done by running casing or pipe into the wellbore and pumping a cement slurry down the pipe and into the annulus or annular space formed intermediate the outside of the pipe and the wall of the wellbore and maintaining the cement slurry there to allow it to set and bond the pipe to the wall of the wellbore. Problems sometimes occur in cementing wells using a heavy or dense cement slurry, particularly where weak or lost circulation zones are penetrated by the wellbore, because the hydrostatic pressure of the heavy cement slurry is sufficiently great to break down the formation and allow the slurry to be lost thereinto. In such instances it is highly desirable to use a light or low density cement slurry to provide a sufficiently low hydrostatic pressure on the weak formations or lost circulation zones that the formations are not broken down.

Light cement slurries are also usually less expensive than heavy cement slurries and thus are desired for economic reasons. Normally, the strength of the cement formed from a light cement slurry is less than that formed from a heavy cement slurry but the properties of the light cement slurry may be controlled to provide a set cement having sufficiently high strength for use in wellbores.

As discussed above, it is well known to use water swellable clays in cement slurries to "extend" the cement and increase the yield thereof. As noted by Beach, it is common practice to incorporate in cement compositions hydratable colloidal clays, particularly bentonite, in the cement composition to increase the volume of cement slurry obtained from a given amount of cement and thereby reduce the cost of the cement. Cements containing hydratable clays are commonly referred to as gel cements. Also, commonly the term gel cement has been used to denote a cement containing bentonite therein and the term salt water gel cement has been used to denote a cement containing attapulgite.

The terms "water swelling or swellable clays", "hydratable clays" and "water dispersible clays" have been used to describe clays such as those of the montmorillonite and palygorskite group of clays which swell or disperse in either fresh or salt water. The montmorillonite group of clays hydrate well in fresh water but much less so in salt water or brine whereas the palygorskite clays readily disperse in fresh water and brines or salt water. This characteristic of the palygorskite clays differs somewhat from the hydration of the montmorillonite clays in fresh water but is sometimes referred to as hydration or aging. Herein the term "water swellable clays" is used to include the clays of the montmorillonite and palygorskite groups and any other clays which swell, hydrate, or disperse in either fresh or salt water regardless of the mechanism by which this action takes place.

As noted above, Smith discovered that a much higher yield is obtained by prehydrating water swellable clays such as bentonite, montmorillonite, palygorskite, and the like prior to contacting or mixing the clays with cement. Smith noted that 1% of bentonite prehydrated with water before mixing with cement is equivalent to 4% to 5% dry blended bentonite cement.

Patchen found that the amount of attapulgite required to reduce the density of a portland cement slurry to a desired value is less than the amount of bentonite required to effect the same result.

I have discovered that the effectiveness of water swellable clays as extenders to increase the yield of cement is greatly enhanced by preshearing an aqueous mixture of the water swellable clays prior to blending the water swellable clays with the cement. This preshearing of the aqueous solution of water swellable clays enhances their effectiveness as cement extenders greatly over that of either using the water swellable clays in dry form with the cement or in prehydrating or aging the water swellable clays prior to mixing the clays with the cement. I have further found that 1% of either attapulgite or bentonite vigorously presheared for a predetermined time before being mixed with the cement is equal to about 8% dry blended bentonite. I have further found that this enhanced effect can be had when using brine as mixing water. When using brine as mixing water, attapulgite may be mixed with the brine and the attapulgite brine solution presheared for a predetermined time and thereafter mixed with the cement to form a cement slurry. When using bentonite, best results are obtained by forming a mixture of the bentonite in fresh water and preshearing the bentonite fresh water suspension a predetermined time and thereafter mixing this presheared bentonite fresh water solution with brine prior to mixing with cement therewith to form a cement slurry. In the carrying out of the preshearing of the water swellable clays in accordance with this invention, the clays are also prehydrated but the effectiveness of the clays as cement extenders is significantly improved by preshearing.

Particular problems have been incurred in cementing shallow strings of casings such as conductor and surface casing in wellbores drilled in cold regions such as Cook Inlet, Alaska, offshore Nova Scotia and Greenland, and the North Sea. I have discovered a method of forming and a formulation of a lightweight cement slurry weighing about 13.0 pounds per gallon which may be used in cementing with shallow strings of casing in wellbores drilled in cold regions. A specific formulation applicable for such use is comprised of portland Class G cement containing 2% attapulgite that has been presheared and aged a predetermined amount of time in seawater containing about 2% calcium chloride ($CaCl_2$) based on cement. Such a slurry will develop at least 100 psi of compressive strength in 24 hours at 40° F.

For a more detailed description of this invention, reference is now made to the FIGURE of the drawing. As illustrated there, a water swellable clay is fed into a mixing hopper 1 and thence to a jet mixer 3 charged by a pump 2 where it is mixed with water or an aqueous fluid to form clay suspension. The clay suspension is flowed from the jet mixer 3 via a conduit 9 into a first tank 5 and flowed therefrom, e.g., by gravity, via a conduit 11 into a second tank 7 and therefrom via a conduit 13 to the pump 2 and thence through a conduit 15 for recirculation through the jet mixer 3. Suitable tanks for use as tanks 5 and 7 are mud tanks which may be, for example, of about 400-barrel capacity and which are commonly used in drilling operations. The pump 2 is desirably a centrifugal pump since centrifugal pumps shear and agitate fluids much more than progressive cavity or piston-type pumps. The clay suspension is recirculated through the jet mixer 3 for a predetermined time to shear the water swellable clay. This shearing of the clay is hereafter referred to as preshearing inasmuch as this action takes place prior to mixing the clay suspension with cement to form a cement slurry. The concentration of the clay in the aqueous clay suspension is normally controlled to provide a concentration of water swellable clay when mixed into a cement slurry within the range of about 0.1 to 3.0 weight percent water swellable clay based upon cement. The circulation of the aqueous mixture of water swellable clay, aqueous clay suspension, through the jet mixer 3 provides for vigorously shearing the aqueous mixture of water swellable clay. This vigorous shearing action is carried out for a time period within the range of about one-half to four hours. Thereafter, the presheared aqueous mixture of water swellable clay is ready for use in forming a cement slurry. Piping and valving (not shown) are provided to continuously deliver the aqueous clay suspension to a cementing unit (not shown) for forming a cement slurry for use in cementing a well.

In an embodiment of this invention, a suspension of attapulgite, or other clays that are swellable in brine, and brine such as seawater is formed, presheared and used as mixing water for forming a cement slurry. Additives may be included in the brine, such as calcium chloride and sodium chloride. The attapulgite is added to the brine in an amount to provide a concentration of attapulgite when mixed into a cement slurry within the range of about 0.1 to 3.0 weight percent based on cement, and the aqueous suspension of attapulgite is subjected to vigorous shearing for at least one-half of an hour. Thereafter the aqueous suspension of attapulgite is blended with dry cement to form a pumpable cement slurry having attapulgite therein in a concentration within the range of 0.1 to 3.0 weight percent based on cement. This cement slurry is then injected into a well for use therein.

In accordance with another embodiment, a lightweight cement slurry weighing about 13.0 pounds per gallon is formed by blending Class G portland cement with about 2% attapulgite which has been presheared in seawater having about two weight percent calcium chloride based on cement added thereto. This lightweight cement slurry is particularly applicable for cementing shallow casing strings such as conductor and surface casing in wells drilled in cold regions. This lightweight cement slurry will set and develop at least 100 psi of compressive strength in 24 hours at 40° F. The calcium chloride is added to the slurry to accelerate the setting thereof. The calcium chloride should be added to the seawater before adding the attapulgite thereto.

In accordance with still another embodiment, clays that are swellable in fresh water as exemplified by bentonite may be used as a cement extender for slurries which are formed with seawater. In this embodiment there is formed a suspension of fresh water swellable clay exemplified by bentonite in fresh water and this suspension is presheared as previously described. The bentonite is added to the fresh water in an amount to provide a concentration of bentonite when mixed into a cement slurry within the range of about 0.1 to 4.0 weight percent based on cement. Preferably the amount of fresh water used in carrying out this embodiment is an amount of at least about ¼ to ⅓ of the total amount of water required for forming the cement slurry. Desirably a minimum amount of fresh water is used in locations such as offshore locations where fresh water is scarce and brine is readily available. The minimum amount of fresh water which can be used is controlled by the thickness of the bentonite suspension. Normally this minimum amount of fresh water is about ¼ of the total water required in forming the slurry. The use of less fresh water would produce a bentonite suspension that is too thick to readily pump. The fresh water-bentonite suspension should not be further sheared after it is added to the seawater because such further shearing will reduce the cement extending characteristics of the bentonite. The fresh water-bentonite suspension should be added to the seawater rather than the seawater being added to the fresh water-bentonite suspension. Addition of seawater to the fresh water-bentonite suspension may result in a suspension which is too viscous to pump. The preshearing of the bentonite in fresh water in accordance with this embodiment enhances the effectiveness of bentonite as an extender for cement to the effect that only about half as much bentonite is required as contrasted to that which would be required where the bentonite is only prehydrated in fresh water.

Experimental work which has been carried out shows that the step of preshearing the water swellable clays enhances the cement extending characteristics thereof much more so than does prehydration alone. It should be noted that in carrying out the preshearing step the clays are also prehydrated.

In order to better understand the experimental work and data thereof which was carried out, certain terms and considerations should be understood. These are set out below:

1. Cement slurries mixed with water containing 1% preaged bentonite or attapulgite have rheological properties and are extended similar to slurries made from cements containing 3.6% dry blended bentonite;
2. Attapulgite, bentonite, CaCl$_2$, and water are given in weight percent based on cement in the cement slurry ultimately to be formed; and
3. Salt (NaCl) is given in weight percent based on mixing water.

The experimental work that was carrid out to show the effects of preshearing and preaging or prehydrating water swellable clays as exemplified by attapulgite and bentonite on their effectiveness as extenders for cements mixed using seawater is described below.

Shear Tests Run at 80° F.

In carrying out these tests attapulgite and bentonite were tested separately by adding to mixing water in a Waring blender during a 15-second time period at a low speed on the Waring blender and then stirring (shearing) an additional 35 seconds at high speed. This was followed by 2 minutes shearing at low speed and thereafter 5 minutes shearing at the same low speed. After each shearing period the rheological properties of the suspensions were measured using a Fann viscometer. The results of these tests using 1%, 2%, and 3% attapulgite, 3.6%, 7.2%, and 10.8% bentonite, 1% and 2% bentonite (prehydrated in fresh water and then added to seawater) are shown in TABLE I. Salt (NaCl) and CaCl$_2$ were added to the seawater in some tests. The plastic viscosity ($\mu$) and yield point ($\phi$) of the suspensions were determined using the Fann viscometer.

TABLE I

EFFECTS OF SHEAR ON THE PROPERTIES OF ATTAPULGITE AND BENTONITE SUSPENSIONS

| Sample No. | 1A | 1B | 1C | 2A | 2B | 2C | 3A | 3B | 3C | 4A | 4B | 4C |
|---|---|---|---|---|---|---|---|---|---|---|---|---|
| Composition | | | | | | | | | | | | |
| Class | | | | | | | | | | | | |
| G Cement, gm | | | | | | | | | | | | |
| Bentonite, gm/% | 18/3.6 | | | | | | 54/10.8 | | | | | |
| Attapulgite, gm/% | | | | 5/1 | | | | | | 15/3 | | |
| Salt, gm/% | | | | | | | | | | | | |
| CaCl$_2$, gm/% | | | | | | | | | | | | |
| Water, gm/% | | | | | | | | | | | | |
| Sea Water, gm/% | 330/66 | | | 330/66 | | | 330/66 | | | 330/66 | | |
| Amount of Shear, min. | API* | Low 2 | Low 5 | API | Low 2 | Low 5 | API | Low 2 | Low 5 | API | Low 2 | Low 5 |
| Fann Data: 600 RPM | 4.5 | 5 | 6 | 5 | 6 | 8 | 18 | 25 | 40 | 9 | 15.5 | 19 |
| 300 RPM | 3 | 3.5 | 4.5 | 3.5 | 4.5 | 6 | 14 | 20 | 33 | 6 | 13 | 16 |
| Plastic Viscosity ($\mu$), CPS | 1.5 | 1.5 | 1.5 | 1.5 | 1.5 | 2 | 4 | 5 | 7 | 3 | 2.5 | 3 |
| Yield Point ($\phi$), lb/100 sq ft | 1.5 | 2.0 | 3.0 | 2.0 | 3.0 | 4 | 10 | 15 | 26 | 3 | 10.5 | 13 |
| 1-Gel, lb/100 sq ft | 1 | 1 | 1 | 1 | 1 | 2 | 5.5 | 10.5 | 19 | 1.5 | 5 | 10 |

| Sample No. | 5A | 5B | 5C | 6A | 6B | 6C | 7A | 7B | 7C | 8A | 8B | 8C |
|---|---|---|---|---|---|---|---|---|---|---|---|---|
| Composition | | | | | | | | | | | | |
| Class | Bent. pre-hyd for 1 hr in 100 ml fresh water for Samples 5A–5C | | | | | | | | | | | |
| G Cement, gm | | | | | | | | | | | | |
| Bentonite, gm/% | 5/1% | | | 36/7.2 | | | | | | 36/7.2 | | |
| Attapulgite, gm/% | | | | | | | 10/2 | | | | | |
| Salt, gm/% | | | | | | | | | | | | |
| CaCl$_2$, gm/% | | | | | | | | | | 10/2 | | |
| Water, gm/% | 100/20 | | | | | | | | | | | |
| Sea Water, gm/% | 230/46 | | | 433/86.6 | | | 433/86.6 | | | 433/86.6 | | |
| Amount of Shear, min. | API | Low 2 | Low 5 | API | Low 2 | Low 5 | API | Low 2 | Low 5 | API | Low 2 | Low 5 |
| Fann Data: 600 RPM | 10 | 9 | 8.5 | 8 | 10 | 10 | 6.5 | 8.5 | 11 | 5.5 | 6.5 | 7.5 |
| 300 RPM | 7 | 6 | 5.5 | 6 | 7 | 8 | 4.5 | 6.5 | 8.5 | 3.5 | 4.5 | 5.5 |
| Plastic Viscosity ($\mu$), CPS | 3 | 3 | 3.0 | 2 | 3 | 2 | 2.0 | 2.0 | 2.5 | 2.0 | 2.0 | 2.0 |
| Yield Point ($\phi$), | 4 | 3 | 2.5 | 4 | 4 | 6 | 2.5 | 4.5 | 6 | 1.5 | 2.5 | 3.5 |

TABLE I-continued
EFFECTS OF SHEAR ON THE PROPERTIES OF ATTAPULGITE AND BENTONITE SUSPENSIONS

| lb/100 sq ft I-Gel, lb/100 sq ft | 2 | 1.5 | 1.5 | 1 | 2 | 2.5 | 1.5 | 2 | 3.5 | 1 | 2 | 3 |
|---|---|---|---|---|---|---|---|---|---|---|---|---|
| Sample No. | 9A | 9B | 9C | 10A | 10B | 10C | 11A | 11B | 11C | 12A | 12B | 12C | 13A | 13B | 13C |
| Composition | | | | | | | | | | (For Samples 12A–13C) | | | | | |
| Class G Cement, gm | | | | | | | | | | Bent. pre-hyd for 2 hrs in 133 ml fresh water then added to 300 ml sea water. | | | | | |
| Bentonite, gm/% | | | | 36/7.2 | | | | | | 10/2 | | | 10/2 | | |
| Attapulgite, gm/% | 10/2 | | | | | | 10/2 | | | | | | | | |
| Salt, gm/% | | | | 28.1/6.5 | | | 28.1/6.5 | | | 28.1/6.5 | | | | | |
| CaCl$_2$, gm/% | 10/2 | | | | | | | | | | | | 10/2 | | |
| Water, gm/% | | | | | | | | | | 133/26.6 | | | 133/26.6 | | |
| Sea Water, gm/% | 433/86.6 | | | 433/86.6 | | | 433/86.6 | | | 300/60.0 | | | 300/60.0 | | |
| Amount of Shear, min. | API | Low 2 | Low 5 | API | Low 2 | Low 5 | API | Low 2 | Low 5 | API | Low 2 | Low 5 | | | |
| Fann Data: | | | | | | | | | | | | | | | |
| 600 RPM | 3.5 | 5 | 6.5 | 5.5 | 6 | 9.5 | 7.0 | 8.5 | 10.0 | 16.5 | 13 | 11 | 13 | 11.5 | 11 |
| 300 RPM | 2 | 3.5 | 5 | 3.5 | 4 | 7.5 | 5.0 | 6.5 | 8 | 13.5 | 10.5 | 9 | 10 | 8.5 | 8 |
| Plastic Viscosity ($\mu$), CPS | 1.5 | 1.5 | 1.5 | 2.0 | 2 | 2 | 2.0 | 2.0 | 2 | 3.0 | 2.5 | 2 | 3 | 3 | 3 |
| Yield Point ($\phi$), lb/100 sq ft | 0.5 | 2 | 3.5 | 1.5 | 2 | 5.5 | 3.0 | 4.5 | 6 | 10.5 | 8 | 7 | 7 | 5.5 | 5 |
| I-Gel, lb/100 sq ft | 1 | 2 | 3 | 1 | 2 | 3 | 1 | 2 | 3 | 6 | 5 | 4 | 3 | 2.5 | 2.5 |

*API shear calls for 15 seconds at low speed and 35 seconds at high speed using a two-speed Waring Blender.

Shear Tests at 40° F.

These tests were run to simulate conditions in certain areas where the cement slurries of this invention may be used. For example, in the North Sea the year-round temperature is about 40° F. To maintain a 40° F. environment for these tests, a small low temperature bath (about 64 liters) was converted to a simulated mud pit. A Premier Dispersator with a 2-inch blade, Premier Mill Corporation, Reading, Pa., was placed in one end of the bath for shearing the attapulgite and bentonite. A small centrifugal pump was run continuously to circulate the fluid in the temperature bath and better uniformly maintain the temperature throughout.

Attapulgite and Bentonite Aqueous Suspensions Tested at 40° F.

The above-described apparatus was used for testing attapulgite and bentonite suspensions as indicated below:

a. Attapulgite presheared and preaged in salt water;
b. Attapulgite presheared and preaged in seawater plus 6.5% NaCl based on seawater;
c. Attapulgite presheared and preaged with seawater plus 2% CaCl$_2$ based on cement;
d. Bentonite presheared and prehydrated in fresh water and then added to seawater.

In these tests the attapulgite and bentonite were added to the water in 5 minutes with the Dispersator at maximum speed. The suspensions were then stirred at maximum speed for two additional 30-minute periods and finally were aged for 23 hours with only the small centrifugal pump running. After each shearing period the rheological properties of the suspensions were measured. The results of these tests are shown in TABLE II.

TABLE II
EFFECTS OF SHEAR AND AGING ON THE PROPERTIES OF ATTAPULGITE AND BENTONITE SUSPENSIONS AT 40° F.

| | Attapulgite Pre-Aged in Sea Water | | | | Attapulgite In Sea Water Plus Salt | | | |
|---|---|---|---|---|---|---|---|---|
| Sample No. | 20A | 20B | 20C | 20D | 21A | 21B | 21C | 21D |
| Composition | | | | | | | | |
| Attapulgite, gm | 1440 | | | | 1440 | | | |
| Bentonite, gm | | | | | | | | |
| Salt, gm | | | | | 4160 | | | |
| CaCl$_2$, gm | | | | | | | | |
| Sea Water Salts, gm | 2685 | | | | 2685 | | | |
| Water, ml | 64000 | | | | 64000 | | | |
| Amount of Shear, hours | 0 | 0.5 | 1.0 | | 0 | 0.5 | 1.0 | |
| Amount of Aging, hours | | | | 23 | | | | 23 |
| Fann Data: | | | | | | | | |
| 600 RPM | 4 | 4.5 | 5 | 5 | 4.5 | 4.5 | 5 | 5 |
| 300 RPM | 2 | 3 | 3.5 | 3.5 | 2.5 | 3.0 | 3.5 | 3 |
| Plastic Viscosity ($\mu$), CPS | 2 | 1.5 | 1.5 | 1.5 | 2.0 | 1.5 | 1.5 | 2 |
| Yield Point ($\phi$), lb/100 sq ft | 0 | 1.5 | 2.0 | 2 | 0.5 | 0.5 | 2.0 | 1 |
| 1-Gel, lb/100 sq ft | 1 | 1.5 | 2 | 1 | 0.5 | 0.5 | 1 | 1 |

TABLE II-continued
EFFECTS OF SHEAR AND AGING ON THE PROPERTIES OF ATTAPULGITE AND BENTONITE SUSPENSIONS AT 40° F.

| | Attapulgite in Sea Water Plus CaCl$_2$ | | | | Bentonite Pre-Hyd in Fresh Water, Then Added to Sea Water | | | | | |
|---|---|---|---|---|---|---|---|---|---|---|
| Sample No. | 22A | 22B | 22C | 22D | 23A | 23B | 23C | 23D | 23E | 23F |
| Composition | | | | | | | | | | |
| Attapulgite, gm | 1440 | | | | | | | | Add 24000 Pre-Hyd to 40000 Sea Water | Dilute 23E 50:50 With Sea Water |
| Bentonite, gm | | | | | 1440 (Pre-Hyd) in 24000 Ml | | | | | |
| Salt, gm | | | | | | | | | | |
| CaCl$_2$, gm | 1280 | | | | | | | | | |
| Sea Water Salts, gm | 2685 | | | | 1678 | | | | | |
| Water, ml | 64000 | | | | | | | | | |
| Amount of Shear, hours | 0 | 0.5 | 1.0 | | 0 | 0.5 | 1.0 | | | |
| Amount of Aging, hours | | | | 23 | | | | 23 | | |
| Fann Data: | | | | | | | | | | |
| 600 RPM | 3.5 | 4.5 | 5 | 10 | 34.5 | 41 | 44 | No Data | 25 | 7 |
| 300 RPM | 2.0 | 2.5 | 3 | 6.5 | 22.0 | 27 | 30 | | 20 | 5 |
| Plastic Viscosity ($\mu$), CPS | 1.5 | 2.0 | 2 | 3.5 | 12.5 | 14 | 14 | | 5 | 2 |
| Yield Point ($\phi$), lb/100 sq ft | 0.5 | 0.5 | 1 | 3 | 9.5 | 13 | 16 | | 15 | 3 |
| 1-Gel, lb/100 sq ft | 0.5 | 1.0 | 1 | 1 | 1.5 | 5 | 5 | | 6 | 2 |

Cement Slurries Tested

Using the procedures and apparatus outlined in API RP 10B 20th Edition, April 1977, "Recommended Practice for Testing Oil-Well Cements and Cement Additives", cement slurries were prepared using the four presheared, 23-hour aged suspensions described above. The compositions and properties of slurries prepared using two Class G portland cements referred to as B and C Class G cement obtained from different suppliers are given in TABLE III.

To give a basis of comparison, slurry density and yield calculations for 1%, 2%, and 3% attapulgite and bentonite unsheared are given in TABLE IV.

TABLE III
COMPOSITION AND PROPERTIES OF CEMENT SLURRIES PREPARED USING SHEARED AND AGED ATTAPULGITE AND BENTONITE SUSPENSIONS AT 40° F.

| | Attapulgite Pre-Aged in Seawater | | | Attapulgite Pre-Aged in Seawater Plus Salt | | | | |
|---|---|---|---|---|---|---|---|---|
| Sample No. | 1 | 1 | 2 | 3 | 4 | 7 | 8 | |
| Properties | | | | | | | | |
| B Class G Cement, gm | 500 | | | 500 | | 500 | | |
| C Class G Cement, gm | | | 500 | | 500 | | | |
| Attapulgite Suspension 20D, ml | 422 | | 422 | | | | | |
| Attapulgite Suspension 21D, ml | | | | 422 | 422 | 422 | 422 | |
| Attapulgite Suspension 22D, ml | | | | | | | | |
| Bentonite Suspension 23F, ml | | | | | | | | |
| Slurry Weight, lb/gal | 13.2 | | | 13.2 | 13.2 | 13.2 | 13.2 | 13.2 |
| Fann Data: After mix/after Hall. | (B) | (A) | (B) | (A) | (B) | (A) | (B) | (A) | (B) | (A) | (B) | (A) |
| 600 RPM | 55 | 103 | 45 | 95 | 41 | 55 | 51 | 110 | 42 | 67 | 52 | 114 | 51 | 70 |
| 300 RPM | 46 | 89 | 37 | 81 | 34 | 46 | 41 | 93 | 33 | 54 | 43 | 100 | 42 | 59 |
| Plastic Viscosity ($\mu$), cps | 9 | 14 | 8 | 4 | 7 | 9 | 10 | 17 | 9 | 13 | 9 | 14 | 9 | 11 |
| Yield Point ($\phi$), lb/100 sq ft | 37 | 75 | 29 | 76 | 27 | 37 | 31 | 76 | 24 | 41 | 34 | 86 | 33 | 48 |
| 1-Gel, lbs/100 sq ft | 35 | | 23 | 23 | 15 | 16 | 27 | 30 | 58 | 23 | 36 | 37 | 33 | 30 | 38 |
| Water Separation, ml | 1 | | | 0.8 | 6.5 | | 0.5 | | 2.5 | | 0.5 | | 3.3 | |
| Compressive Strength, psi | | | | | | | | | | | | | | |
| In 1 day | 63 | | | 50 | | 75 | | 50 | | | | | | |
| In 3 days | 393 | | | 383 | | 370 | | 390 | | | | | | |
| In 7 days | 925 | | | 693 | | 808 | | 733 | | | | | | |
| Halliburton Consistency, Units | | | | | | | | | | | | | | |
| In 0 minutes | 6 | | 4.5 | | 2.5 | | 4.5 | | | | | | | |
| In 5 minutes | 6 | | 5.0 | | 3.0 | | 5 | | | | | | | |
| In 10 minutes | | | | | | | | | | | | | | |
| In 20 minutes | 8 | | 7.5 | | 4.0 | | 8 | | | | | | | |

| | Attapulgite Pre-Aged in Seawater Plus CaCl$_2$ | | | | | | Bentonite Pre-Hyd in Fresh Then Added to Seawater | |
|---|---|---|---|---|---|---|---|---|
| Sample No. | 9 | 10 | 11 | 12 | 13 | 14 | 15 | 16 |
| Properties | | | | | | | | |
| B Class G Cement, gm | | 500 | | 500 | | 500 | 500 | |

TABLE III-continued

COMPOSITION AND PROPERTIES OF CEMENT SLURRIES PREPARED USING SHEARED AND AGED ATTAPULGITE AND BENTONITE SUSPENSIONS AT 40° F.

| | | | | | | | | | | | | |
|---|---|---|---|---|---|---|---|---|---|---|---|---|
| C Class G Cement, gm | 500 | | 500 | | 500 | | 500 | | | | | |
| Attapulgite Suspension 20D, ml | | | | | | | | | | | | |
| Attapulgite Suspension 21D, ml | | | | | | | | | | | | |
| Attapulgite Suspension 22D, ml | 422 | 422 | 422 | 422 | 422 | | 422 | | | | | |
| Bentonite Suspension 23F, ml | | | | | | | | | 422 | | 422 | |
| Slurry Weight, lb/gal | 13.2 | 13.2 | | | 13.2 | | 13.2 | | 13.2 | | 13.2 | |
| Fann Data: After mix/after Hall. | (B) | (B) | (A) | (A) | (B) | (A) | (B) | (A) | (B) | (A) | (B) | (A) |
| 600 RPM | 50 | 72 | 104 | 88 | 52 | 134 | 81 | 100 | 49 | 92 | 44 | 64 |
| 300 RPM | 42 | 61 | 88 | 72 | 43 | 120 | 72 | 86 | 41 | 79 | 34 | 49 |
| Plastic Viscosity (μ), cps | 8 | 11 | 16 | 16 | 9 | 14 | 9 | 14 | 8 | 13 | 10 | 15 |
| Yield Point (φ), lb/100 sq ft | 34 | 50 | 72 | 56 | 34 | 106 | 63 | 72 | 33 | 66 | 24 | 34 |
| 1-Gel, lbs/100 sq ft | 32 | 26 | 35 | 45 | 33 | 55 | 37 | 47 | 28 | 40 | 20 | 27 |
| Water Separation, ml | | | 0.1 | 1.5 | | 0 | | 1.0 | | 1.5 | | 3.7 |
| Compressive Strength, psi | | | | | | | | | | | | |
| In 1 day | 120 | 135 | | | | | | | 56 | | 50 | |
| In 3 days | 495 | 475 | | | | | | | 280 | | 375 | |
| In 7 days | 000 | 955 | | | | | | | 743 | | 765 | |
| Halliburton Consistency, Units | | | | | | | | | | | | |
| In 0 minutes | | | 2 | 6 | | | | | 5 | | 3 | |
| In 5 minutes | | | 4 | 6 | | | | | 6 | | 4 | |
| In 10 minutes | | | | | | | | | | | | |
| In 20 minutes | | | 9 | 6 | | | | | 7 | | 4 | |

(B) Denotes before stirring 20 minutes using a Halliburton Consistometer
(A) Denotes after stirring 20 minutes using a Halliburton Consistometer

TABLE IV

SLURRY DENSITY AND YIELD CALCULATIONS
(For 1, 2 and 3% Attapulgite and Bentonite Cements)

| Volume of Solids Gal. | Specific Volume, Gal. | Material | Amount, lbs | Water Requirement, Gal. |
|---|---|---|---|---|
| For 1% Preaged Attapulgite, 1% Prehydrated Bentonite and 3.6% Bentonite | | | | |
| 3.59 | 0.0382 | Class G Cement | 94.00 | 5.00 |
| 0.04 | 0.0453 | Attapulgite | 0.94 | 2.26 |
| | | Sea Water | 62.04 | 3.63 |
| 3.63 | | | 156.98 | 10.89 |
| Slurry Density = 14.4 lb/gal | | | | |
| Slurry Yield = 1.46 cu ft/94-lb sk | | | | |
| For 2% Preaged Bentonite, 2% Prehydrated Bentonite and 7.2% Bentonite | | | | |
| 3.59 | 0.0382 | Class G Cement | 94.00 | 5.00 |
| 0.09 | 0.0453 | Attapulgite | 1.88 | 4.52 |
| | | Sea Water | 81.40 | 3.58 |
| 3.86 | | | 177.28 | 13.20 |
| Slurry Density = 13.4 lb/gal | | | | |
| Slurry Yield = 1.76 cu ft/94-lb sk | | | | |
| For 3% Preaged Bentonite, 3% Prehydrated Bentonite and 10.8% Bentonite | | | | |
| 3.59 | 0.0382 | Class G Cement | 94.00 | 5.00 |
| 0.13 | 0.0453 | Attapulgite | 2.82 | 6.78 |
| | | Sea Water | 100.72 | 3.72 |
| 3.72 | | | 197.54 | 15.50 |
| Slurry Density = 12.7 lb/gal | | | | |
| Slurry Yield = 2.07 cu ft/94-lb sk | | | | |

Effects of Shear at 80° F.

In the tests run at 80° F., 1%, 2%, and 3% attapulgite and 3.6%, 7.2%, and 10.8% dry bentonite were sheared in seawater. Two percent attapulgite, bentonite prehydrated in fresh water, and 7.2% dry bentonite were sheared in seawater containing 2% $CaCl_2$. One percent and 2% bentonite were prehydrated in fresh water, added to seawater and then sheared. One percent and 2% attapulgite, 2% bentonite prehydrated in fresh water, and 7.2% dry bentonite were sheared in seawater containing 6.5% salt (NaCl) based on water.

The results in TABLE I show that shearing does not increase plastic viscosity significantly but does increase initial gel strength and yield point for all suspensions except bentonite prehydrated in fresh water and added to seawater. The results for samples 5A, 5B, and 5C, 12A, 12B, and 12C, and 13A, 13B, and 13C given in TABLE I show that shearing a suspension formed by prehydrating bentonite in fresh water after adding it to seawater lowers initial gel strength and yield point. Shearing attapulgite and bentonite in seawater and bentonite in fresh water will enhance them as extenders for cement.

Effects of Shear at 40° F.

To test the effects of shear on clay suspensions, 1440 grams (2 weight percent based on cement) of attapulgite were added to (1) 64000 grams of seawater, (2) seawater containing 6.5% salt, and (3) seawater containing 2% $CaCl_2$. Each slurry was sheared for one hour and then aged 23 hours at 40° F. To test bentonite, 1440 grams (2 weight percent based on cement) of bentonite were added to 24,000 grams of fresh water. The slurry was sheared for one hour, prehydrated in the simulated mud pit for 23 hours at 40° F. and then added to 40,000 grams of seawater. The results are given in TABLE II and show conclusively that shearing attapulgite in seawater and bentonite in fresh water before adding it to seawater greatly enhances their effectiveness as cement extenders. Aging the attapulgite for 23 hours after the shear period had little effect in seawater or in seawater plus salt. However, where the seawater contained $CaCl_2$, aging doubled the plastic viscosity and yield point.

Shearing the bentonite in fresh water enhanced its effectiveness as an extender for cement. The data obtained for Sample 23E in TABLE II shows that adding the bentonite sheared in fresh water to seawater increases the plastic visocity, yield point and initial gel strength to about twice that of the sheared and aged attapulgite suspensions. To reduce these values to near those of attapulgite, the suspension was diluted with an equal volume of seawater and the data therefor is shown for Sample 23F in TABLE II. The result of this clearly shows that preshearing and prehydrating bentonite in fresh water before adding it to seawater reduces the amount of bentonite required as a cement extender to about half that required if the bentonite is prehydrated only. Thus, when used at a rig site, this results in both a saving of fresh water and bentonite.

Cement Slurries Prepared Using Sheared and Aged Attapulgite and Bentonite

In TABLE III the composition and properties of cement slurries prepared using presheared and preaged attapulgite and bentonite suspensions are shown. In TABLE III slurries were prepared from two Class G cements indicated as "B" and "C" cements. The data obtained shows that cements prepared from the suspensions formed by preshearing and preaging attapulgite and seawater containing 2% $CaCl_2$ had lower water separations and higher compressive strengths than cement slurries prepared from the other three.

In order for the laboratory shear test to be of greatest value for field operations, it is desirable to correlate the levels of shear produced in the laboratory to those which may be produced at a drilling rig. It has been determined primarily from rig experience that mixing ½ to 4 hours at the rig with a 6-inch mud hopper, the jet of which is charged by a centrifugal pump having a 6-inch discharge and 8-inch intake, will bracket the levels of shear used in the described laboratory tests. Another technique for shearing the attapulgite and bentonite in the field to the same degree as that which was carried out in the laboratory involves testing the aqueous attapulgite and bentonite suspensions in the field until the rheological properties thereof coincide with those obtained in the laboratory tests described above. The suspensions would then be sufficiently presheared as to be ready for use. As a practical rule of thumb, the attapulgite and bentonite aqueous suspensions can be prepared for use as cement extenders in the field by adding the attapulgite or bentonite to water and then shearing the suspension across a mud hopper nozzle jet charged with a centrifugal pump and through the pump and nozzle for about ½ to 4 hours or until the rheological properties of the suspension approximately coincide with the rheological properties of the C and D samples of TABLE II.

Suitable hydraulic cements for use in accordance with this invention are hydraulic cements such as portland cement.

Suitable water swellable clays for use in this invention include those of the montmorillonite group of which bentonite is commonly used in drilling and cementing wells for the oil and gas industry. Bentonite, commonly called gel, is a clay composed almost exclusively of the clay mineral, sodium montmorillonite, and is mined principally in Wyoming and South Dakota. It is a hydrous, alumina silicate which has platelike-shaped crystalline structure. Other suitable montmorillonite clays are amargosite, beidellite, chloropal, erinite, ferromontmorillonite, hectorite, magnesium beidellite, metabentonite, montmorillonite, nontronite, otaylite, saponite, and smecite.

Suitable water swellable clays for use in accordance with this invention and particularly for use in brine or salt water are the palygorskite group of clays. The principal clay in this group is attapulgite. Attapulgite is a clay which consists principally of the mineral attapulgite and is mined in the United States in southwestern Georgia and northwestern Florida. It is a hydrous magnesium aluminum silicate whose crystalline structure is needlelike in shape. Other suitable palygorskite clays are calciopalygorskite, Floridin-Floridine, Gumbrine, lasallite, meerschaum, palygorskite, alpha-palygorskite, beta-palygorskite, paramontmorillonite, parasepiolite, and sepiolite. Sepiolite is available commercially and has superior temperature stability.

In forming cement slurries in accordance with this invention, sufficient amounts of cement, water, and water swellable clays are used to produce a pumpable cement slurry of a desired density and having suitable rheological properties. Oftentimes it is desirable that the cement slurry have a density within the range of 11.0 to 14.5 pounds per gallon and have rheological properties of plastic viscosity within the range of 6 to 25, of yield point within the range of 20 to 70, and of initial gel strength within the range of 15 to 50. Such desired rheological properties and densities for cement slurries to be used in cementing wells drilled into the earth are well known to those engaged in the well drilling and completing arts.

What is claimed is:
1. A method of cementing a well comprising:
   (a) forming an aqueous suspension of attapulgite in seawater, said attapulgite being present in said water in an amount to provide a concentration of attapulgite when mixed into a cement slurry within the range of 0.1 to 3.0 weight percent based on cement;
   (b) subjecting said suspension to vigorous shearing action for at least 0.5 hour to preshear said aqueous suspension of attapulgite;
   (c) thereafter mixing said aqueous suspension with cement to form said cement slurry having a predetermined density;
   (d) positioning said slurry in said well; and
   (e) maintaining said slurry in said well to allow said slurry to set.
2. A method of cementing a well comprising:
   (a) forming an aqueous suspension of fresh water swellable clay in an amount of fresh water of at least about ¼ of the amount of water required to form a cement slurry, said fresh water swellable clay being present in an amount to provide a concentration when mixed into said cement slurry within the range of 0.1 to 3.0 weight percent based on cement;
   (b) subjecting said aqueous suspension of fresh water swellable clay to vigorous shearing action for at least ½ hour to preshear said fresh water swellable clay;
   (c) adding said presheared suspension of fresh water swellable clay to an amount of seawater which in combination with said fresh water is required for forming said cement slurry;
   (d) mixing said suspension of step (c) with cement to form a cement slurry;
   (e) positioning said slurry in said well; and
   (f) maintaining said slurry in said well to allow said slurry to set.

3. The method of claim 2 wherein said fresh water swellable clay is bentonite.

4. A method of cementing a well comprising:
(a) forming an aqueous suspension of water swellable clay in water, said water swellable clay being present in said water in an amount to provide a concentration of water swellable clay when mixed into a cement slurry within the range of 0.1 to 3.0 weight percent based on cement;
(b) subjecting said suspension to vigorous shearing action for at least 0.5 hour to preshear said aqueous suspension of water swellable clay;
(c) thereafter mixing said presheared aqueous suspension of water swellable clay with cement to form said cement slurry;
(d) positioning said cement slurry in said well; and
(e) maintaining said slurry in said well to allow said slurry to set.

* * * * *

UNITED STATES PATENT AND TRADEMARK OFFICE
CERTIFICATE OF CORRECTION

PATENT NO. : 4,202,413

DATED : May 13, 1980

INVENTOR(S) : Joseph U. Messenger

It is certified that error appears in the above-identified patent and that said Letters Patent are hereby corrected as shown below:

Column 11, line 48, "3.58" should read --3.68--.

Signed and Sealed this

Second Day of September 1980

[SEAL]

Attest:

SIDNEY A. DIAMOND

Attesting Officer

Commissioner of Patents and Trademarks